(12) United States Patent
Komiyama (10) Patent No.: US 7,568,725 B2
(45) Date of Patent: Aug. 4, 2009

(54) CURTAIN AIR BAG DEVICE

(75) Inventor: Manabu Komiyama, Fujinomiya (JP)

(73) Assignee: Nihon Plast Co., Ltd., Shizuoka (JP)

( * ) Notice: Subject to any disclaimer, the term of this patent is extended or adjusted under 35 U.S.C. 154(b) by 0 days.

(21) Appl. No.: 12/059,446

(22) Filed: Mar. 31, 2008

(65) Prior Publication Data

US 2008/0238047 A1    Oct. 2, 2008

(30) Foreign Application Priority Data

Mar. 30, 2007    (JP)    ............................. 2007-091886

(51) Int. Cl.
*B60R 21/16*    (2006.01)
(52) U.S. Cl. .................................. 280/730.2
(58) Field of Classification Search ............... 280/730.2, 280/728.2
See application file for complete search history.

(56) References Cited

U.S. PATENT DOCUMENTS

| | | | |
|---|---|---|---|
| 7,077,426 B2* | 7/2006 | Shaker et al. ............ | 280/730.2 |
| 2002/0195803 A1 | 12/2002 | Terbu et al. | |
| 2003/0094798 A1* | 5/2003 | Ogata et al. ............. | 280/730.2 |
| 2003/0230877 A1* | 12/2003 | Kim et al. ................ | 280/730.2 |
| 2006/0071460 A1* | 4/2006 | Goto ........................ | 280/730.2 |
| 2006/0172874 A1 | 8/2006 | Sugaya et al. | |
| 2007/0126221 A1* | 6/2007 | Yoshida .................... | 280/743.1 |

FOREIGN PATENT DOCUMENTS

| | | |
|---|---|---|
| EP | 1547875 A1 | 6/2005 |
| GB | 2433056 A | 6/2007 |
| GB | 2440672 A | 2/2008 |
| JP | 2003-291771 A | 10/2003 |
| JP | 2004-175304 A | 6/2004 |

OTHER PUBLICATIONS

Combined Search and Examination Report for Application No. GB0805045.2, dated Jul. 15, 2008.

* cited by examiner

*Primary Examiner*—Faye M. Fleming
(74) *Attorney, Agent, or Firm*—Sughrue Mion, PLLC (57) ABSTRACT

An air bag, when in a flattened condition, has a longitudinally extending upper edge and a longitudinally extending lower edge. The longitudinally extending upper and lower edges extend on and along first and second imaginary lines respectively. The air bag comprises a plurality of expandable portions that include a larger expandable portion that has upper and lower edges respectively extending on and along the first and second imaginary lines and a smaller expandable portion that has an upper edge extending on and along the first imaginary line and a lower edge spaced from the second imaginary line by a given distance; and a non-expandable portion having a size-compensating part that extends from the lower edge of the smaller expandable portion to the second imaginary line.

20 Claims, 5 Drawing Sheets

CURTAIN AIR BAG DEVICE

BACKGROUND OF THE INVENTION

1. Field of the Invention

The present invention relates in general to an air bag device that is mounted in a motor vehicle and expands an air bag to protect a vehicle passenger upon a vehicle collision, and more particularly to a curtain air bag device that is mounted on an inside side wall part of a vehicle cabin (or passenger room) and expands a curtain-like air bag to protect both front and rear seat passengers upon a vehicle collision.

2. Description of the Related Art

In order to clarify the present invention, the background of the curtain air bag device will be briefly described in the following with the aid of published documents.

One of the curtain air bag devices hitherto proposed is shown in Japanese Laid-open Patent Application (Tokkai) 2003-291771, which has an elongate or curtain-like air bag that, when not in use, is compactly wound up and neatly received in an elongate holding space that extends from a front pillar to a rear pillar of the vehicle body along a roof side rail. When the vehicle encounters a vehicle collision, such as side-on collision or the like, the curtain like air bag is ejected from the elongate holding space while quickly expanding toward the interior of the vehicle cabin having an outside surface thereof pressed against inside surfaces of side windows (when closed) of the vehicle. With such expansion of the air bag, front and rear seat passengers, namely, side portions of their heads are safely protected.

More specifically, the curtain air bag device of the Japanese Laid-open Application comprises an elongate or curtain-like air bag (viz., air bag proper) that is sized to protect both a front seat passenger and a rear seat passenger, an inflator that feeds the air bag with an inflating gas, and a tension strap that is fixed to a front end of the air bag. Upon expansion of the air bag, the tension strap become tightened to retain the expanded air bag at a given right position.

The curtain like air bag is made of two (viz., inner and outer) base fabrics stitched up together and comprises a front expandable portion that protects the front seat passenger, a rear expandable portion that protects the rear seat passenger, a conduit portion that extends between respective upper parts of the front and rear expandable portions to fluidly connect the two expandable portions, and a non-expandable fabric portion that is not fed with the inflating gas.

The front and rear expandable portions are generally the same in size and shape.

The non-expandable portion is provided below the conduit portion and extends between the front and rear expandable portions. That is, upon expansion of the air bag, the non-expandable fabric portion serves as a retainer for retaining or keeping a given distance between the front and rear expandable portions. With such non-expandable fabric portion and the above-mentioned tension strap, the passenger head protection effect of the two expandable portions is assuredly carried out upon a vehicle collision.

In the curtain air bag device as mentioned hereinabove, it is very important to compactly and correctly wind up the air bag in a flattened condition before being set in the elongate holding space. More specifically, if the flattened air bag is not properly wound up, it becomes very difficult to properly set the wound up air bag in the given holding space. If the setting of the wound up air bag in the holding space is not made properly, effective and reliable expansion of the air bag is not expected upon a vehicle collision.

One measure for eliminating the above-mentioned difficulty is described in Japanese Laid-open Patent Application (Tokkai) 2004-175304, which is an automatic air bag folding device by which the flattened air bag is compactly wound up. Thus, the air bag thus compactly wound up can be easily put into a right position of the holding space.

The automatic air bag folding device of the publication will be briefly described in the following with the aid of FIGS. 8 to 11 of the accompanying drawings.

As is seen from the drawings, the automatic air bag folding device 100 generally comprises a table 111 that has an upper surface 110 on which a flattened air bag 101 is to be flatly placed. The table 111 has a pocket "P" whose bottom is denoted by numeral 121.

Figure 8:
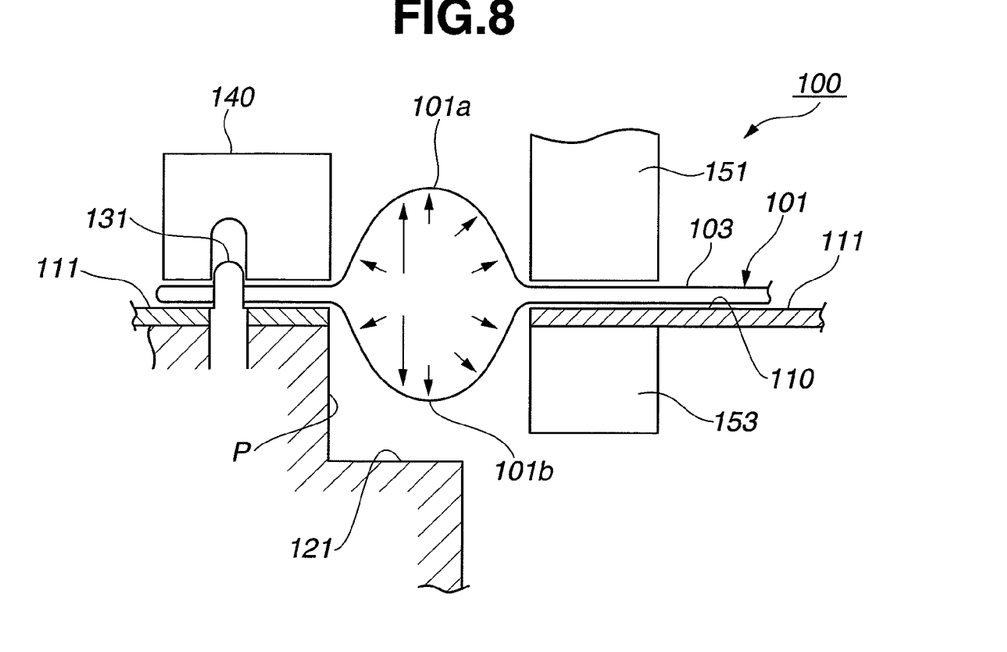
FIGS. 8 to 11 are schematic views depicting a process for winding up a flattened air bag, which is a known process.
Figure 9:
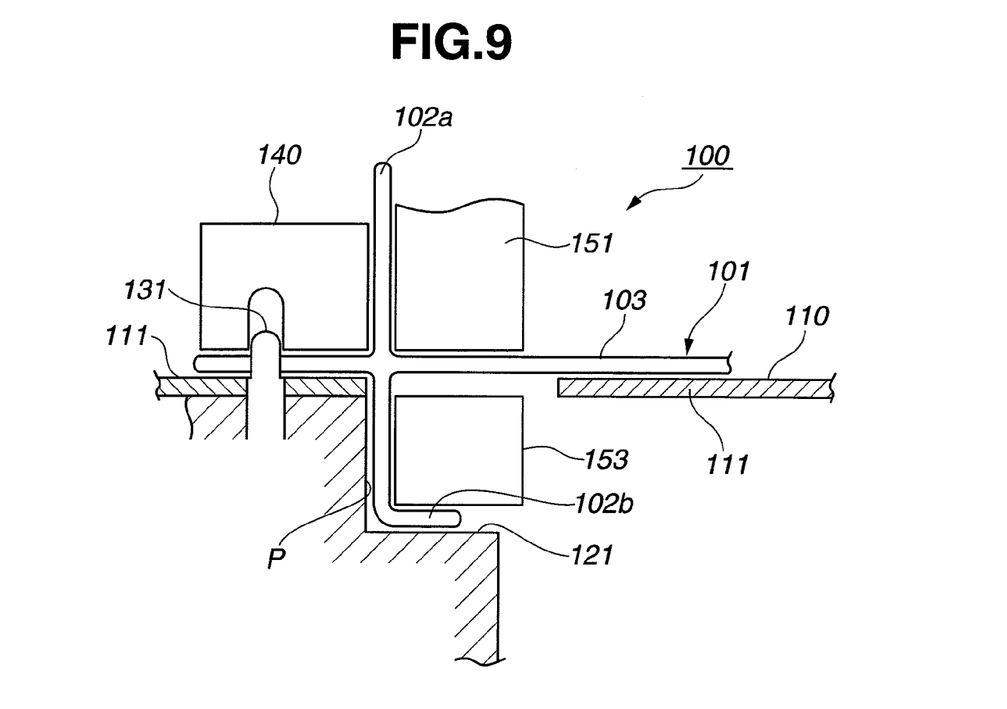

The automatic air bag folding device 100 further comprises an air nozzle (not shown) that feeds the flattened air bag 101 with a pressurized air to expand the air bag 101 thereby separating inner and outer base fabrics 101a and 101b of the air bag 101 from each other as shown in FIG. 8, and first and second pressing blocks 151 and 153 that, as is seen from FIG. 9, are moved leftward to compress the expanded portion of the air bag 101 to produce first and second flattened portions 102a and 102b that extend in opposite directions. As shown in FIG. 8, the table pocket "P" is so sized as to receive the expanded part of the air bag 101, and as shown in FIG. 9, the first flattened portion 102a is sandwiched between the first pressing block 151 and an after-mentioned third pressing block 140, and the second flattened portion 102b is sandwiched between the second pressing block 153 and a side wall of the table pocket "P".

Figure 10:
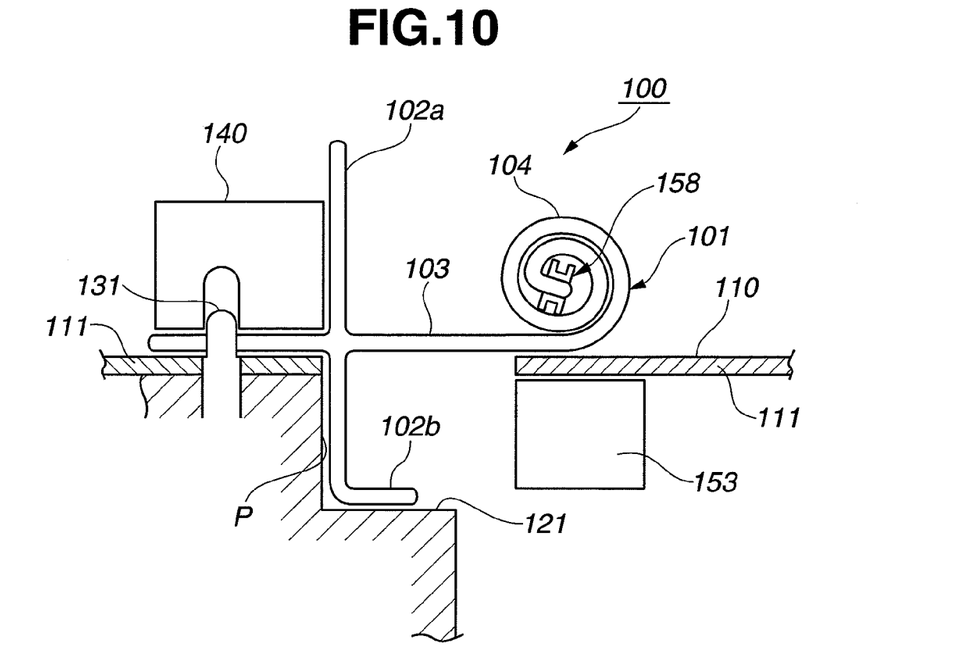
Figure 11:
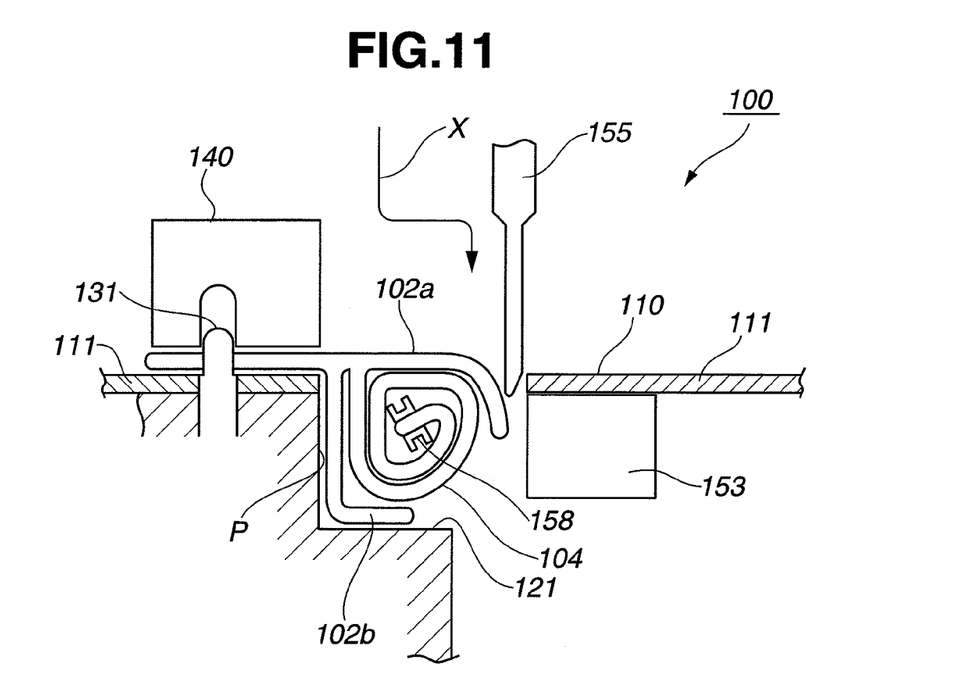

The automatic air bag folding device 100 further comprises a bobbin rod (or saber member) 158 that winds therearound a remained flattened portion 103 of the air bag 101 to produce a wound up mass 104 of the flattened air bag 101 as is seen from FIG. 10, and a pushing plate 155 that functions to push and place the first flattened portion 102a onto the wound up mass 104 as is seen from FIG. 11.

The automatic air bag folding device 100 further comprises a locating pin 131 that is projectable from the table 111 and the third pressing block 140 that receives the projected locating pin 131 to tightly put therebetween a given part of the flattened air bag 101 for assuring positioning of the flattened air bag 101 on the table 111. As shown, for assuring the positioning of the air bag 101, the given part is formed with an opening (no numeral) into which the locating pin 131 projects.

In the following, the process of winding up the flattened air bag by using the automatic air bag folding device 100 will described with the aid of the drawings.

First, a flattened air bag 101 is flatly placed on the surface 110 of the table 111, and then the given part of the air bag 101 is retained by the locating pin 131 and the third pressing block 140, as will be understood from FIG. 8.

Then, as is seen from FIG. 8, the first and second pressing blocks 151 and 153 are moved to a position near the pocket "P" where a first part of the flattened air bag 101 is tightly put between these two pressing blocks 151 and 153 and a second part of the flattened air bag 101 is placed in the pocket "P" without restraint. Then, as is seen from the drawing, by feeding the flattened air bag 101 with a compressed air, the second part of the air bag 101 is expanded and thus the inner and outer base fabrics 101a and 101b there of are separated from each other, as shown.

Then, as is understood from FIGS. 8 and 9, the first and second pressing blocks 151 and 153 are moved leftward in the drawing to compress the expanded portion of the air bag 101.

With this, first and second flattened portions 102a and 102b of the air bag 101 are produced as is seen from FIG. 9.

Then, as is understood from FIGS. 9 and 10, the first and second pressing blocks 151 and 153 are moved away from the third pressing block 140 leaving the first and second flattened portions 102a and 102b therebetween.

Then, as is seen from FIG. 10, the remained flattened portion 103 of the air bag 101 is wound up by the bobbin rod 158 to form the wound up mass 104 of the air bag 101. As is seen from this drawing, by turning the bobbin rod 158 in a counterclockwise direction, the wound up mass 104 moves leftward, that is, toward the third pressing block 140 while enlarging the size thereof.

As is seen from FIG. 11, when coming leftward on the table 111, the wound up mass 104 finally falls into the pocket "P". Then, the pushing plate 155 is moved in a given way indicated by an arrow "X" for placing the first flattened portion 102a onto the wound up mass 104, as shown.

Then, the bobbin rod 158 is pulled out from the wound up mass 104.

It is to be noted that the wound up mass 104 thus produced has a cylindrical, long and narrow shape whose axis extends in a direction perpendicular to the surface of the drawing of FIG. 11. As has been mentioned hereinabove, the wound up mass 104, which is the wound air bag 101, is received in the elongate holding space that is provided by the side upper limited area, viz., the side roof rail 9 (see FIG. 1) of the vehicle cabin.

SUMMARY OF THE INVENTION

However, due to the inherent construction, the automatic air bag folding device of the above-mentioned Japanese Laid-open Patent Application (Tokkai) 2004-175304 is applicable only to air bags of a type that, in a flattened condition, has substantially same front and rear expandable portions. More specifically, the air bags should be of a type in which, when it is flattened, the height of the front expandable portion is substantially same as that of the rear expandable portion. If air bags that are to be wound up are of a type that does not satisfy the above-mentioned shape, that is, if, for example, the front and rear expandable portions have different sizes, the work of winding up the flattened air bag by the bobbin rod 158 is not properly and readily made. That is, in such case, due to the size difference between the front and rear expandable portions, the bobbin rod 158 can't hold respective lower ends of such two expandable portions at the same time, as will be understood when referring to FIG. 10. That is, when the front expandable portion is larger than the rear expandable portion, the lower end of the front expandable portion is placed much below that of the rear expandable portion, and thus, the bobbin rod 158 has to hold only the lower end of the larger front expandable portion. In this case, the lower end of the smaller rear expandable portion is left loosed. Many tries have revealed that a satisfied wound up mass of the air bag is obtained only when the bobbin rod 158 extending in parallel with an upper edge of the air bag holds the respective lower ends of the front and rear expandable portions at the same time.

However, in these days, various types of motor vehicles have made their debut. As is easily known, respective spaces provided in the vehicle cabin for permitting a smoothed expansion of the front and rear expandable portions of the air bag beside the front and rear seats vary according to the types of the motor vehicle. That is, for example, when the motor vehicle is of a coupe type, a relatively larger space is provided beside the front seat and a relatively smaller space is provided beside the rear seat.

Thus, if the above-mentioned known curtain like air bag device is simply mounted in the vehicle without taking any device, it inevitably occurs, upon a vehicle collision, that the front and rear expandable portions, which have the same size, are ejected into the larger and smaller spaces while being expanded. Of course, this is not desirable because of occurrence of a time difference between the time when the front expandable portion shows its best protection performance and the time when the rear expandable portion shows its best protection performance. In other words, due to difficulty in advancing in the smaller space, the rear expandable portion takes a much time to reach the head of the rear seat passage as compared with the front expandable portion.

Furthermore, if sizes of the front and rear expandable portions of the air bag are determined in accordance with sizes of the spaces respectively provided beside the front and rear seats of the coupe type motor vehicle, that is, if the rear expandable portion is made smaller than the front expandable portion, compact and proper winding of the flattened air bag around the bobbin rod 158 is not achieved.

It is therefore an object of the present invention to provide a curtain air bag device which is free of the above-mentioned drawbacks.

That is, according to the present invention, there is provided a curtain air bag device in which a front expandable portion and a rear expandable portion of an air bag are different in size and can exhibit their passenger protection performance in substantially the same manner without producing a time difference therebetween.

Furthermore, according to the present invention, there is provided a curtain air bag device in which even when the front and rear expandable portion of an air bag are different in size, the air bag in a flattened condition can be properly and compactly wound up around a bobbin rod.

That is, according to the present invention, there is provided a curtain air bag device whose curtain like air bag comprises a front expandable portion and a rear expandable portion which are different in size, and a non-expandable fabric portion which serves to allow the entire construction of the air bag in an flattened condition to take a generally rectangular shape which is suited for compactly winding up the flattened air bag and neatly putting the wound up mass of the air bag into an air bag holding space defined in the vehicle cabin.

In accordance with a first aspect of the present invention, there is provided a curtain air bag device for use in a motor vehicle to protect vehicle passengers upon a vehicle collision, which comprises an air bag that, when not in use, is wound up and put in a holding space provided in a side wall part of a passenger room of the vehicle, the air bag having a longitudinally extending upper edge that is to be fixed to the inside side wall part and a longitudinally extending lower edge that is spaced from the longitudinally extending upper edge by a given distance, the longitudinally extending upper and lower edges extending on and along first and second imaginary lines respectively; and an inflator that is installed in the motor vehicle for feeding the air bag with an inflating gas to expand the same upon the vehicle collision, wherein the air bag comprises a plurality of expandable portions that include a larger expandable portion that has upper and lower edges respectively extending on and along the first and second imaginary lines and a smaller expandable portion that has an upper edge extending on and along the first imaginary line and a lower edge spaced from said second imaginary line by a given distance; and a non-expandable portion having a size-compensating part that extends from the lower edge of the smaller expandable portion to said second imaginary line.

In accordance with a second aspect of the present invention, there is provided a curtain air bag device for use in a motor vehicle to protect front and rear seat passengers upon a vehicle collision, which comprises an air bag that, when not in use, is wound up and put in an elongate holding space provided by a roof side rail of the vehicle, the air bag having a longitudinally extending upper edge that is to be fixed to the roof side rail and a longitudinally extending lower edge that is spaced from the longitudinally extending upper edge by a given distance, the longitudinally extending upper and lower edges respectively extending on and along first and second imaginary lines which are substantially in parallel with each other; and an inflator that is installed in the motor vehicle for feeding the air bag with an inflating gas to expand the same upon the vehicle collision, wherein the air bag comprises a plurality of expandable portions that include a larger expandable portion that has upper and lower edges respectively extending on and along the first and second imaginary lines and a smaller expandable portion that has an upper edge extending on and along the first imaginary line and a lower edge spaced from the second imaginary line by a given distance; and a non-expandable portion having a size-compensating part that extends from the lower edge of the smaller expandable portion to the second imaginary line.

In accordance with a third aspect of the present invention, there is provided an air bag for use in a curtain air bag device, which comprises mutually overlapped inner and outer base fabrics that are connected to each other to form a plurality of expandable portions that include a larger expandable portion that has upper and lower edges respectively extending on and along first and second imaginary lines and a smaller expandable portion that has an upper edge extending on and along the first imaginary line and a lower edge spaced from the second imaginary line by a given distance; and a non-expandable fabric portion that is connected to at least one of the inner and outer base fabrics, the non-expandable fabric portion having a size-compensating part that extends from the lower edge of the smaller expandable portion to the second imaginary line.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

In the following, four embodiments E-1, E-2, E-3 and E-4 of the present invention will be described in detail with reference to the accompanying drawings.

For ease of understanding, various directional terms, such as, right, left, upper, lower, rightward and the like are used in the following description. However, these terms are to be understood with respect to only a drawing or drawings on which a corresponding element or portion is shown.

Figure 1:
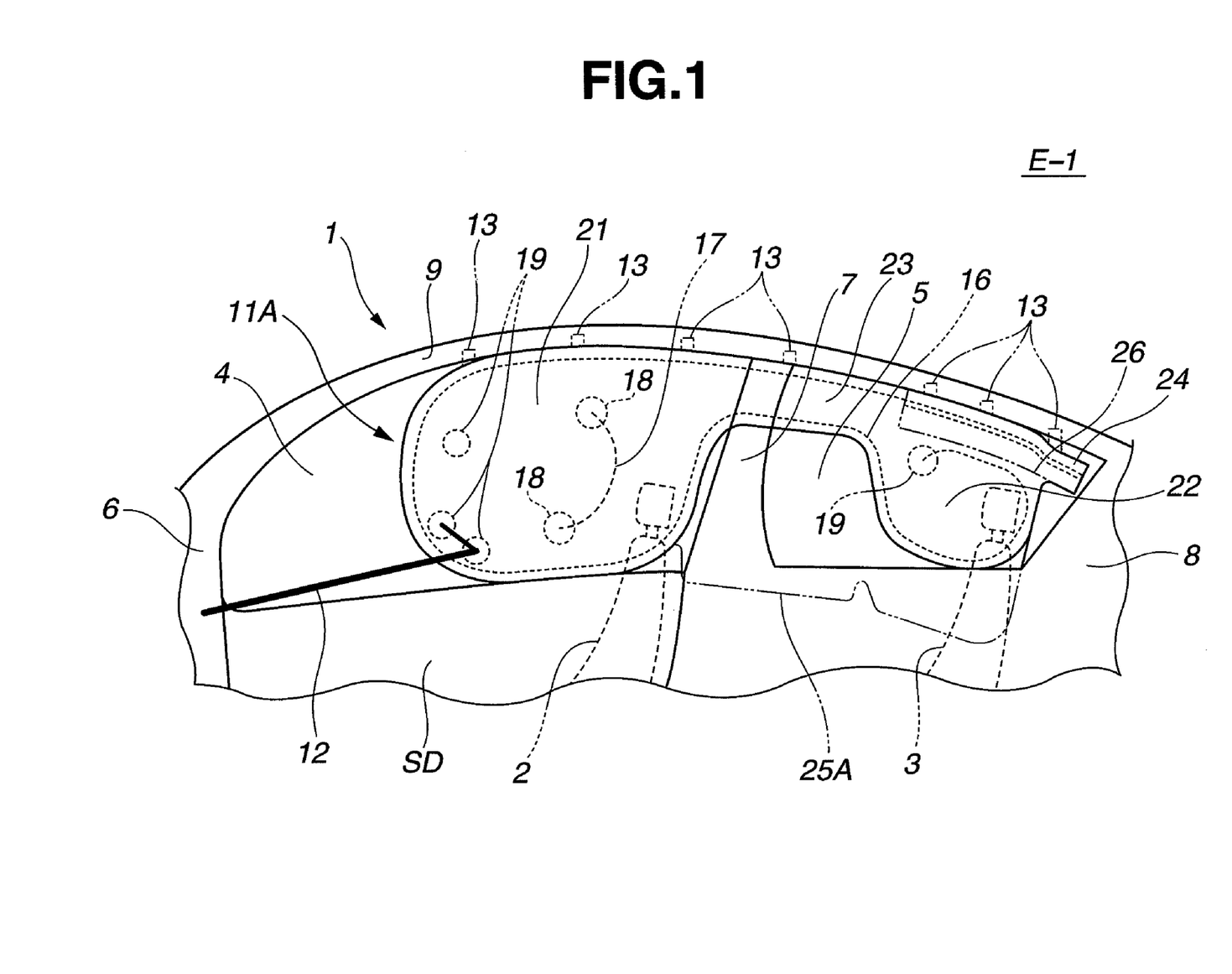
FIG. 1 is a schematic view of a curtain air bag device of a first embodiment of the present invention, showing a condition wherein an air bag which is in a flattened condition is loosely exposed to a vehicle cabin.
Figure 2:
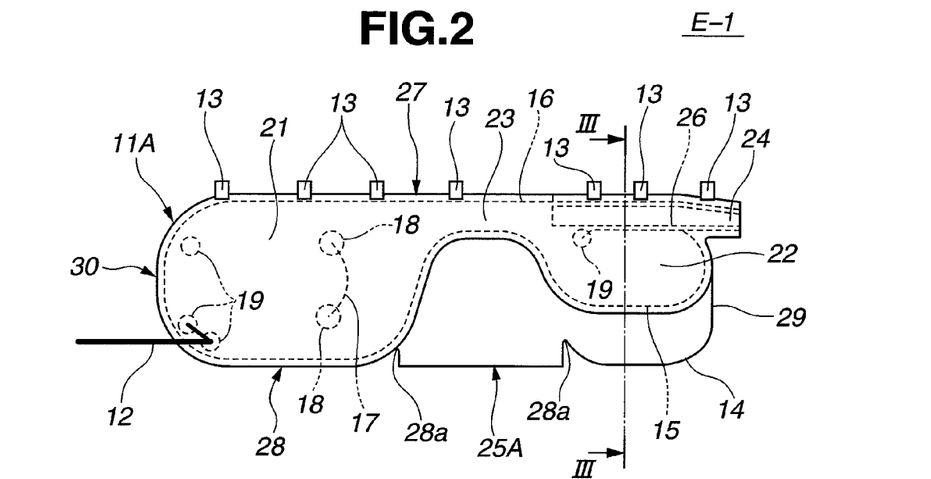
FIG. 2 is a schematic view of the air bag in a flattened condition, which is not wound up yet.
Figure 3:
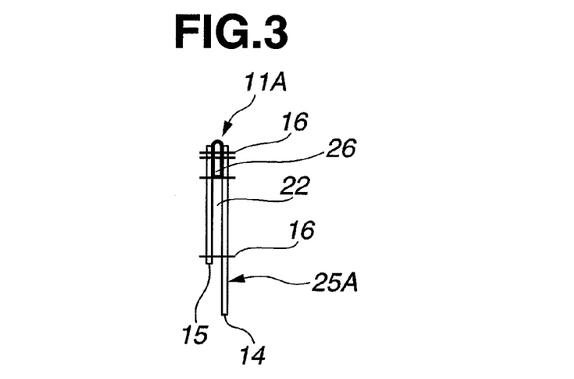
FIG. 3 is a sectional view taken along the line "III-III" of FIG. 2.

Referring to FIGS. 1 to 3, particularly FIG. 1, there is shown a curtain air bag device E-1 of a first embodiment of the present invention. As will be described hereinafter, the curtain air bag device E-1 is constructed to be used in a coupe type motor vehicle.

FIG. 1 shows a motor vehicle in which the curtain air bag device E-1 is mounted on a curved roof side rail 9 of a motor vehicle 1 having a flattened air bag 11A of the device E-1 put out from a given elongate holding space of the air bag device E-1 and thus loosely exposed to a vehicle cabin (or passenger room).

It is to be noted that the motor vehicle 1 shown in the drawing is of a coupe type whose swelled roof has the highest part at a front portion and gradually lowers as a portion nears the end of the vehicle 1. Due to the inevitable shape of the coupe type, the vehicle 1 has a larger front side window 4 and a smaller rear side window 5 that are partitioned by a center pillar 7 of the vehicle 1. The larger front side window 4 is defined when a side door "SD" takes a closed position in a door opening of the vehicle body. The smaller rear side window 5 is formed in a rear side panel of the vehicle body. As shown, the height of the larger front side window 4 is greater that that of the smaller rear side window 5.

Designated by numeral 2 is a backrest of a front seat which is placed beside a rear area of the larger front side window 4, and designated by numeral 3 is a backrest of a rear seat which is placed beside a rear area of the smaller rear side window 5, as shown.

Designated by numerals 6 and 8 are front and rear pillars of the vehicle body that put therebetween the center pillar 7. The curved roof side rail 9 extends from a top of the front pillar 6 to that of the rear pillar 8. The center pillar 7 has a top connected to a rear half part of the curved roof side rail 9, as shown.

The curtain air bag device E-1 comprises a curtain like air bag (viz., air bag proper) 11A, an inflator (not shown) that feeds the air bag 11A with an inflating gas, a tension strap 12 that has a rear end fixed to a front lower portion of the air bag 11A and extends forward, and a plurality of connecting pieces 13 that connect an upper edge of the air bag 11A to the curved roof side rail 9. The inflator is placed at a lower part of the rear pillar 8.

When the curtain air bag device E-1 is properly assembled and mounted to a proper position of the vehicle cabin, the air bag 11A, which has been wound up, is neatly and compactly received in an elongate holding space that is provided by the curved roof side rail 9.

As will be described in detail hereinafter, before being put into the elongate holding space, the wound up air bag 11A is received in a cylindrical sleeve (not shown) that is formed with a plurality of slits. That is, upon operation of the curtain air bag device E-1, the slits are broken by the expanding air bag 11A permitting a rapid ejection of the expanding air bag 11A into the vehicle cabin from the elongate holding space.

As shown the flattened air bag 11A comprises a front expandable portion 21, a rear expandable portion 22, a conduit portion 23 that extends between respective upper portions of the front and rear expandable portions 21 and 22 to fluidly connect the two expandable portions 21 and 22, a gas inlet portion 24 that is provided at a rear upper part of the rear expandable portion 22, and a non-expandable fabric portion 25A that integrally extends downward from respective parts of the front and rear expandable portions 21 and 22 and the conduit portion 23. If desired, the front and rear expandable portions 21 and 22 may be provided with respective gas inlet portions. Of course, in this case, the conduit portion 23 is not needed.

The front and rear expandable portions 21 and 22 are hollow and have respective upper parts connected to front and rear ends of the conduit portion 23. Within the gas inlet portion 24, there is installed a cylindrical protective fabric 26 for protecting the air bag 11A from a highly heated inflating gas discharged from the inflator.

As is seen from FIGS. 2 and 3, the air bag 11A is made of two basic fabrics that are stitched up to each other. That is, the two basic fabrics are an inner base fabric 14 that faces the interior of the vehicle cabin and an outer base fabric 15 that faces outside of the vehicle. These two base fabrics 14 and 15 are overlaid and stitched along a given path indicated by a broken line 16 of FIG. 2.

As will be understood from FIGS. 2 and 3, the inner base fabric 14 is generally rectangular in shape and participates in forming respective parts of the front and rear expandable portions 21 and 22, the conduit portion 23 and the gas inlet portion 24 and an entire part of the non-expandable fabric portion 25A.

While, the outer base fabric 15 is shaped to have a larger front portion, a smaller rear portion and a narrow middle portion that extends between the larger front and smaller rear portions. In other words, the outer base fabric 15 has a shape corresponding to the shape defined by the given path denoted by the broken line 16 in FIG. 2. Thus, the outer base fabric 15 participates in forming respective parts of the front and rear expandable portions 21 and 22, the conduit portion 23 and the gas inlet portion 24.

It is to be noted that the outer base fabric 15 does not participate in forming the non-expandable fabric portion 25A.

For example, the inner and outer base fabrics 14 and 15 are each made of a fabric that is woven from 66 Nylon (trade name) of 315 denier and has a mass per unit area of 200 g/m$^2$. The fabric is coated with a rubber or silicone resin. Of course, the material of the inner and outer base fabrics 14 and 15 is not limited to the above-mentioned one. That is, various types of material may be used for the fabrics 14 and 15 as long as they exhibit a satisfied performance as the material for the air bag 11A.

Furthermore, as is seen from FIGS. 2 and 3, particularly FIG. 2, the inner and outer base fabrics 14 and 15 at portions that constitute the front expandable portion 21 are stitched by a given length to constitute a gas flow controlling part 17. With this gas flow controlling part 17, the inflating gas directed into the front expandable portion 21 is separated to upper and lower gas flows. For strengthening the gas flow controlling part 17, each end of the part 17 is stitched circularly, which is indicated by numeral 18. If desired, such gas flow controlling parts may be provided at other portions for obtaining a desirable gas flow in the expanded air bag 11A.

Denoted by numerals 19, 19 are portions where the inner and outer base fabrics 14 and 15 are stitched. With such stitched portions 19, 19, the gas flow in the expanded air bag 11A is suitably controlled.

As is seen from FIG. 2, when the air bag 11A is in a flattened condition, an upper edge of the front expandable portion 21 and that of the rear expandable portion 22 are aligned to constitute a straight upper edge 27 or a first imaginary line.

In the illustrated example of the air bag 11A, the height of the rear expandable portion 22 is about a half of that of the front expandable portion 21.

As is mentioned hereinabove, the non-expandable fabric portion 25A has a front curved edge integral with a rear edge of the front expandable portion 21, a highly raised upper edge integral with a lower edge of the conduit portion 23, a curved middle edge integral with a front edge of the rear expandable portion 22 and a rear upper edge integral with a lower edge of the rear expandable portion 22.

The non-expandable fabric portion 25A has a straight lower edge that is aligned with a straight lower edge of the front expandable portion 21 to constitute a straight lower edge 28 or second imaginary line. As shown, the straight lower edge 28 and the above-mentioned straight upper edge 27 are in parallel with each other.

The straight lower edge 28 is formed with two cuts 28*a* and 28*a*. With such cuts 28*a* and 28*a*, projection of the wound up air bag 11A from the elongate holding space is rapidly carried out upon operation of the curtain air bag device E-1.

As shown, a rear edge of the non-expandable fabric portion 25A is aligned with a rear edge of the rear expandable portion 22 to constitute a rear edge 29 of the air bag 11A.

A front edge 30 of the air bag 11A is constituted by a front edge of the front expandable portion 21. As shown, the front edge 30 and the above-mentioned rear edge 29 are substantially parallel to each other. Accordingly, when the air bag 11A is not expanded and thus it is flattened and flatly placed on a table, the air bag 11A is entirely rectangular in shape as is seen from FIG. 2.

As will be understood from FIG. 1, the tension strap 12 has a front end fixed to a lower portion of the front pillar 6. Usually, the tension strap 12 is compactly received in the front pillar 6. However, upon a vehicle collision, the tension strap 12 is pulled out from the front pillar 6 by the air bag 11A under expanding and finally holds the front lower part of the expanded air bag 11A, as is seen from FIG. 1. Due to the holding work of the tension strap 12, the expanded air bag 11A can be held in a stable position.

As is seen from FIGS. 1 and 2, the connecting pieces 13 are provided to spaced portions of the upper edge 27 of the air bag 11A and fixed to the roof side rail 9 by means of connecting bolts or the like.

In the following, the process of compactly winding up the flattened air bag 11A and neatly putting the compactly wound up air bag 11A into the elongate holding space defined by the roof side rail 9 will be described in detail with reference to FIGS. 1 and 2 and FIGS. 8 to 11.

First, as has been mentioned hereinabove with the aid of the drawings of FIGS. 8 to 11, the flattened air bag 11A (see FIG. 2) is wound up. It is now to be noted that due to the generally rectangular shape of the air bag 11A in a flattened condition, winding of the flattened air bag 11A around the bobbin rod 158 (see FIG. 10) is compactly and properly achieved. That is, when finally wound up, the straight lower edge 28 of the flattened air bag 11A is placed at a center of the wound up mass of the air bag, like the leading end (see FIG. 10) of the remained flattened portion 103 that is pinched by the bobbin rod 158. Furthermore, upper portions of the inner and outer base fabrics 14 and 15, that extend along the straight upper edge 27 and are separated from each other, constitute two flattened portions that correspond to the first and second flattened portions 102a and 102b (see FIG. 11).

Then, the wound up air bag 11A is received in a cylindrical sleeve (not shown) that has a plurality of slits. As has been mentioned hereinabove, such slits are provided for permitting a rapid ejection of the expanding air bag 11A into the vehicle cabin. The cylindrical sleeve has a plurality of aligned openings for putting therethrough the connecting pieces 13 of the air bag 11A.

Then, the cylindrical sleeve having therein the wound up air bag 11A is put into the elongate holding space and the connecting pieces 13 are fixed to the roof side rail 9. Then, the tension strap 12 is set in the right position of the front pillar 6.

Although not shown in the drawings, a suitable decorative member is installed along the roof side rail 9 to conceal both the cylindrical sleeve and tension strap 12 from view.

In the following, operation of the curtain air bag device E-1 will be described with reference to FIG. 1.

For ease of understanding, the following description is directed to a case wherein front and rear seats (2 and 3) carry thereon respective passengers.

As is described hereinabove, in a normal condition, the wound up air bag 11A is neatly received in the elongate holding space of the roof side rail 9 together with the cylindrical sleeve.

When the vehicle encounters a vehicle collision, such as side-on collision or the like, a collision sensor (not shown) operates the inflator, so that the inflator feeds the wound up air bag 11A with an inflating gas through the gas inlet portion 24. With this, the front and rear expandable portions 21 and 22 of the air bag 11A are rapidly expanded while breaking the cylindrical sleeve and rushing out into the vehicle cabin. During this, the tension strap 12 is pulled out from the front pillar 6 and finally holds the front lower part of the expanding air bag 11A.

Thus, the expanded front and rear expandable portions 21 and 22 protect heads of the front and sear seat passengers, more specifically, side portions of their heads respectively. As is seen from FIG. 1, upon expansion of the air bag 11A, the non-expandable fabric portion 25A provided between the expanded front and rear expandable portions 21 and 22 functions to safely hold a right shoulder of the rear seat passenger.

In the following, advantages expected from the curtain air bag device "E-1" of the first embodiment of the present invention will be described.

First, as is mentioned hereinabove, upon a vehicle collision, the front and rear expandable portions 21 and 22 of the air bag 21 assuredly protect the heads of the front and rear seat passengers. Furthermore, the non-expandable fabric portion 25A can safely protect the right shoulder of the rear seat passenger.

Second, even when the front and rear expandable portions 21 and 22 have different sizes due to the inevitable style (viz., coupe style) of the motor vehicle, provision of the non-expandable fabric portion 25A provides the flattened air bag 11A with an entirely rectangular shape. This rectangular shape is quite advantageous when the flattened air bag 11A is needed to be wound up for producing the wound up mass of the air bag 11A that is to be neatly put in the elongate holding space of the roof side rail 9. Actually, the lower edge of the flattened air bag 11A that extends along the second imaginary line 28 (see FIG. 2) can be entirely pinched or held by the bobbin rod 158 (see FIG. 10), which assures production of the compactly wound up mass of the flattened air bag 11A. That is, if such non-expandable fabric portion 25A is not provided, the winding up action of the flattened air bag 11A by the bobbin rod 158 is not properly carried out because the bobbin rod 158 can not hold the respective lower edges of the front and rear expandable portions 21 and 22 at the same time.

Third, because the front and rear expandable portions 21 and 22 of the air bag 21 are so sized as to suit to front and rear spaces that are respectively provided beside the front and rear seats (2 and 3) under the curved roof of the coupe style motor vehicle, expansion of such front and rear expandable portions 21 and 22 is smoothly and reliably made.

Fourth, even when a vehicle collision brings about breakage of the side window glasses, the expanded air bag 11A that is rectangular in shape due to provision of the non-expandable fabric portion 25A blocks bursting of the broken glass pieces into the vehicle cabin, which protects the vehicle passengers from the glass pieces.

Figure 4:
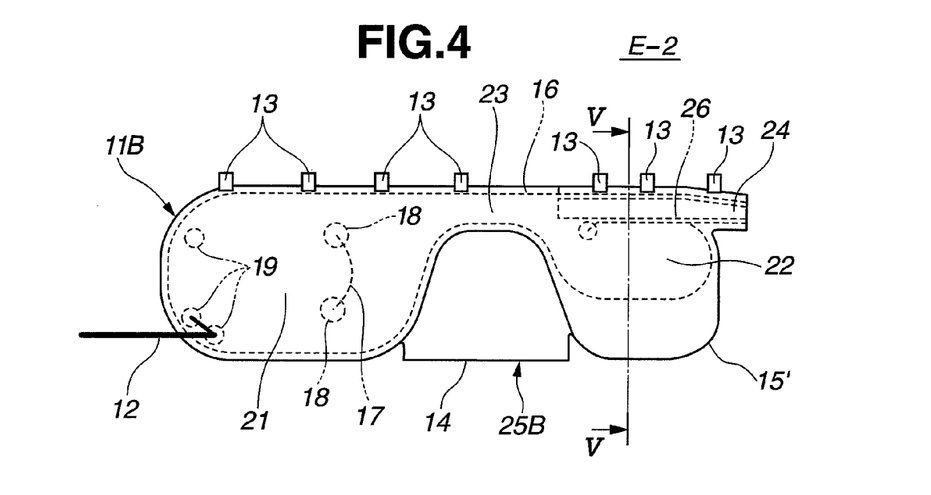
FIG. 4 is a view similar to FIG. 2, but showing an air bag that is used in a curtain air bag device of a second embodiment of the present invention.
Figure 5:
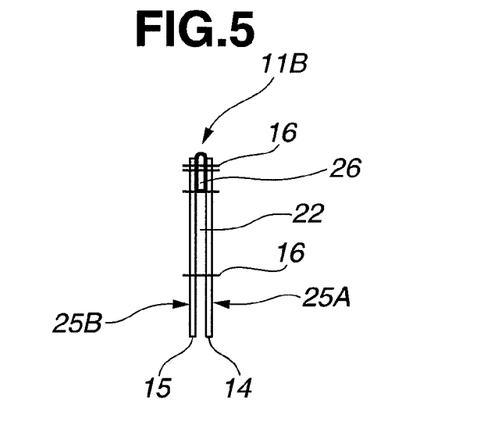
FIG. 5 is a sectional view taken along the line "V-V" of FIG. 4.

Referring to FIGS. 4 and 5, there is shown a flattened air bag 11B that is used in a curtain air bag device "E-2" of a second embodiment of the present invention.

As is seen from these drawings, in this embodiment "E-2", a non-expandable fabric portion 25B has an extra part 15' of the outer base fabric 15, that extends downward from a lower edge of the rear expandable portion 22 to the lower edge of the inner base fabric 14. Due to provision of such extra part 15', the advantageous function of the non-expandable fabric portion 25B is much assured.

Figure 6:
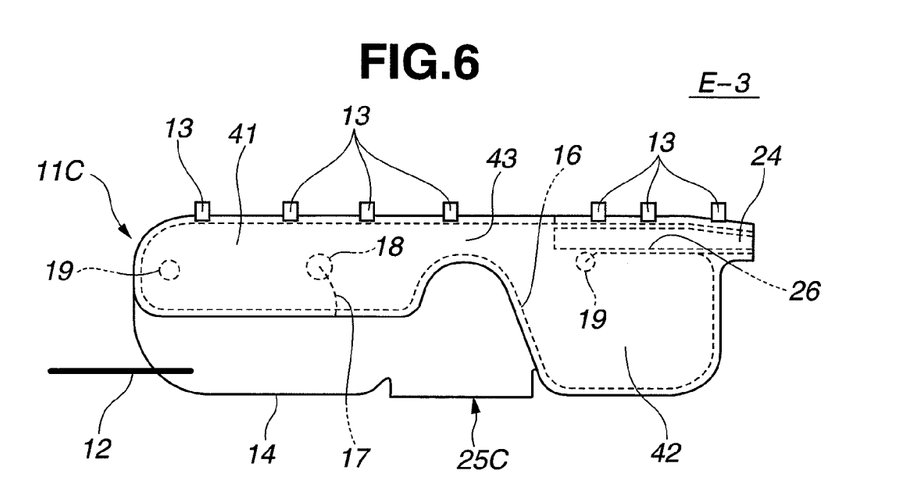
FIG. 6 is a view similar to FIG. 2, but showing an air bag that is used in a curtain air bag device of a third embodiment of the present invention.

Referring to FIG. 6, there is shown a flattened air bag 11C that is used in a curtain air bag device "E-3" of a third embodiment of the present invention. This curtain air bag device "E-3" is suitable for the motor vehicles of a type that has a smaller space beside the front seat and a larger space beside the rear seat.

As is seen from the drawing, the flattened air bag 11C comprises front and rear expandable portions 41 and 42 which are fluidly connected by a shorter conduit portion 43, and a non-expandable fabric portion 25C. As shown, in this air bag 11C, the height of the front expandable portion 41 is smaller than that of the rear expandable portion 42, and the non-expandable fabric portion 25C is constructed of only an extra part of the inner base fabric 14. The non-expandable fabric portion 25C has a straight upper edge integral with a lower edge of the front expandable portion 41, a rear rounded upper edge integral with a lower edge of the shorter conduit portion 43 and a rear slanted edge integral with a front slanted edge of the rear expandable portion 42.

Figure 7:
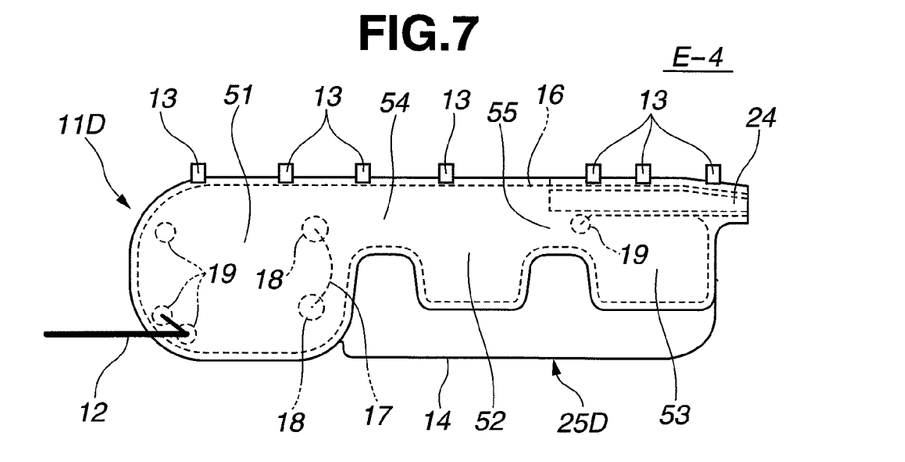
FIG. 7 is a view similar to FIG. 2, but showing an air bag that is used in a curtain air bag device of a fourth embodiment of the present invention.

Referring to FIG. 7, there is shown a flattened air bag 11D that is used in a curtain air bag device "E-4" of a fourth embodiment of the present invention. This curtain air bag deice "E-4" is suitable for the motor vehicles of a type that has a larger space beside the front seat, a smaller space beside a middle seat and another smaller space beside the rear seat.

As is seen from the drawing, the flattened air bag 11D comprises a larger front expandable portion 51, a smaller middle expandable portion 52 and a smaller rear expandable portion 53 which are fluidly connected by front and rear conduit portions 54 and 55, and a non-expandable fabric portion 25D. As shown, also in this air bag 11D, the non-expandable fabric portion 25D is constructed of only an extra part of the inner base fabric 14. The non-expandable fabric portion 25D has a front edge integral with a rear edge of the front expandable portion 51, a front raised edge integral with a lower edge of the front conduit portion 54, a front lowered edge integral with a lower edge of the middle expandable portion 52, a rear raised edge integral with a lower edge of the rear conduit portion 55 and a rear lowered edge integral with a lower edge of the rear expandable portion 53.

In the foregoing description, it is explained that stitching is used for constituting the air bag from two base fabrics 14 and 15. Of course, besides the stitching, other known methods may be used for providing the air bag. One is a method of employing "Jacquard weaving" that automatically provides woven fabrics with bag portions during weaving.

The entire contents of Japanese Patent Application 2007-091886 filed Mar. 30, 2007 are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. A curtain air bag device for use in a motor vehicle to protect vehicle passengers upon a vehicle collision, comprising:
   an air bag that, when not in use, is wound up and put in a holding space provided in a side wall part of a passenger room of the vehicle, the air bag having a longitudinally extending upper edge that is to be fixed to the inside side wall part and a longitudinally extending lower edge that is spaced from the longitudinally extending upper edge by a given distance, the longitudinally extending upper and lower edges extending on and along first and second imaginary lines respectively; and
   an inflator that is installed in the motor vehicle for feeding the air bag with an inflating gas to expand the same upon the vehicle collision,
   wherein the air bag comprises:
   a plurality of expandable portions that include a larger expandable portion that has upper and lower edges respectively extending on and along the first and second imaginary lines and a smaller expandable portion that has an upper edge extending on and along the first imaginary line and a lower edge spaced from said second imaginary line by a given distance; and
   a non-expandable portion having a size-compensating part that extends from the lower edge of the smaller expandable portion to said second imaginary line, and
   wherein the air bag is constructed of inner and outer base fabrics that are connected to each other to constitute the larger expandable portion, the conduit portion and the smaller expandable portion, and in which one of the inner and outer base fabrics has an extra part that constitutes the non-expandable portion.

2. A curtain air bag device as claimed in claim 1, in which the first and second imaginary lines are substantially in parallel with each other.

3. A curtain air bag device as claimed in claim 1, in which the expandable portions are fluidly connected to one another through conduit portions.

4. A curtain air bag device as claimed in claim 1, in which every adjacent two of the expandable portions have therebetween the non-expandable portion.

5. A curtain air bag device as claimed in claim 1, in which the inner base fabric has the extra part that constitutes the non-expandable portion.

6. A curtain air bag device as claimed in claim 3, in which the air bag is constructed of inner and outer base fabrics that are connected to each other to constitute the larger expandable portion, the conduit portion and the smaller expandable portion, and in which the inner and outer base fabrics have respective extra parts that constitute the non-expandable portion.

7. A curtain air bag device as claimed in claim 1, in which when the air bag is entirely flattened, a height of the larger expandable portion is greater than that of the smaller expandable portion.

8. A curtain air bag device as claimed in claim 1, in which the smaller expandable portion is provided with a gas inlet portion through which the expanding gas from the inflator is led into the interior of the air bag.

9. A curtain air bag device as claimed in claim 1, in which the larger expandable portion is provided with a gas inlet portion through which the expanding gas from the inflator is led into the interior of the air bag.

10. A curtain air bag device as claimed in claim 1, in which the upper edge of the air bag is formed therealong with a plurality of connecting pieces that are to be fixed to the inside side wall part of the passenger room.

11. A curtain air bag device as claimed in claim 1, in which each of the expandable portions has therein a gas flow controlling part for controlling the flow of inflating gas led into the air bag from the inflator.

12. A curtain air bag device as claimed in claim 1, further comprising a tension strap that has one end fixed to a front lower end of the air bag and the other end fixed to a given part of the motor vehicle.

13. A curtain air bag device as claimed in claim 1, further comprising a cylindrical sleeve that receives therein the wound up air bag and is received in the holding space, the cylindrical sleeve being formed with a plurality of slits for facilitating breakage of the cylindrical sleeve upon expansion of the air bag.

14. A curtain air bag device as claimed in claim 1, in which the smaller expandable portion includes first and second smaller expandable portions that are fluidly connected through a conduit portion, and in which the first smaller expandable portion is positioned between the larger expandable portion and the second smaller expandable portion.

15. A curtain air bag device as claimed in claim 1, in which the side wall part of the passenger room is a roof side rail that extends from a top of a front pillar to a top of a rear pillar of the vehicle, the roof side rail having a middle portion put on a top of a center pillar of the vehicle.

16. A curtain air bag device as claimed in claim 1, in which the material of the air bag is a fabric that is woven from 66 Nylon of 315 denier and has a mass per unit area of 200 g/m$^2$.

17. A curtain air bag device for use in a motor vehicle to protect front and rear seat passengers upon a vehicle collision, comprising:
   an air bag that, when not in use, is wound up and put in an elongate holding space provided by a roof side rail of the vehicle, the air bag having a longitudinally extending upper edge that is to be fixed to the roof side rail and a longitudinally extending lower edge that is spaced from the longitudinally extending upper edge by a given distance, the longitudinally extending upper and lower edges respectively extending on and along first and second imaginary lines which are substantially in parallel with each other; and
   an inflator that is installed in the motor vehicle for feeding the air bag with an inflating gas to expand the same upon the vehicle collision,
   wherein the air bag comprises:
   a plurality of expandable portions that include a larger expandable portion that has upper and lower edges respectively extending on and along the first and second imaginary lines and a smaller expandable portion that has an upper edge extending on and along the first imaginary line and a lower edge spaced from the second imaginary line by a given distance; and a non-expandable portion having a size-compensating part that extends from the lower edge of the smaller expandable portion to the second imaginary line, wherein the size-compensating part comprises only a single sheet of fabric.

18. A curtain air bag device as claimed in claim 17, in which the air bag further comprises a conduit portion that extends between the larger and smaller expandable portions to establish a fluid communication therebetween, the conduit portion having an upper edge that extends on and along the first imaginary line.

19. An air bag for use in a curtain air bag device, comprising:

mutually overlapped inner and outer base fabrics that are connected to each other to form a plurality of expandable portions that include a larger expandable portion that has upper and lower edges respectively extending on and along first and second imaginary lines and a smaller expandable portion that has an upper edge extending on and along the first imaginary line and a lower edge spaced from the second imaginary line by a given distance; and a non-expandable fabric portion that is connected to at least one of the inner and outer base fabrics, the non-expandable fabric portion having a size-compensating part that is an extra part of only one of the inner and outer base fabrics and extends from the lower edge of the smaller expandable portion to the second imaginary line.

20. An air bag as claimed in claim 19, in which the non-expandable fabric portion is integral with at least one of the inner and outer base fabrics.

* * * * *